United States Patent [19]

Lee

[11] Patent Number: 5,671,102

[45] Date of Patent: Sep. 23, 1997

[54] APPARATUS FOR LOCKING TAPE RECORDER DOOR

[75] Inventor: Jae-soo Lee, Seoul, Rep. of Korea

[73] Assignee: Samsung Electronics Co., Ltd., Kyungki-do, Rep. of Korea

[21] Appl. No.: 638,053

[22] Filed: Apr. 26, 1996

[30] Foreign Application Priority Data

Nov. 8, 1995 [KR] Rep. of Korea ................. 95-40270

[51] Int. Cl.⁶ .................................................. G11B 15/675
[52] U.S. Cl. ..................................................... 360/96.5
[58] Field of Search ............................ 360/85, 93, 94, 360/95, 96.5, 96.6, 137; 242/335, 338.4, 338

[56] References Cited

U.S. PATENT DOCUMENTS

| 4,795,109 | 1/1989 | Chung et al. | 360/96.5 |
| 5,243,478 | 9/1993 | Kawakami et al. | 360/96.5 |
| 5,371,639 | 12/1994 | Bryer | 360/96.5 |
| 5,383,072 | 1/1995 | Lee | 360/96.5 |
| 5,386,329 | 1/1995 | Ikegawa | 360/95 |
| 5,402,286 | 3/1995 | Hamahata | 360/96.5 |
| 5,430,587 | 7/1995 | Engan | 360/96.5 |
| 5,430,588 | 7/1995 | Rasmussen | 360/96.5 |

FOREIGN PATENT DOCUMENTS

| 58-94158 | 6/1983 | Japan | 360/96.5 |
| 2-281461 | 11/1990 | Japan | 360/96.5 |

Primary Examiner—Jefferson Evans
Attorney, Agent, or Firm—Sughrue, Mion, Zinn, Macpeak and Seas

[57] ABSTRACT

An apparatus for locking a tape recorder door where even when a cassette is not loaded in the recorder, foreign objects are prevented from being inserted through the tape recorder door which is blocked by a locking pin of a locking lever, so that a breakdown or an accident due to the insertion of a foreign object can be avoided. However, when the cassette is inserted, an opening pin of an opening lever is pushed by the edge of the cassette to thereby raise the locking lever which is engaged with the opening lever, thus opening the door.

5 Claims, 9 Drawing Sheets

APPARATUS FOR LOCKING TAPE RECORDER DOOR

BACKGROUND OF THE INVENTION

The present invention relates to an apparatus for locking a tape recorder door and, more particularly, to an apparatus for locking the door of a tape recorder cassette insertion opening in which the door opens when a tape cassette is inserted into the cassette insertion opening but closes when an attempt is made to insert a foreign object, such as a finger or a stick.

When a cassette is inserted into the cassette insertion opening through the door, a cassette holder in a recorder housing accepts the cassette. When the cassette is further inserted, a switch is activated to run a loading motor. Then, a loading means moves the cassette and loads the cassette on reel tables in the housing. The tape recorder door is connected to the housing by a hinge, and it is designed so that an elastic member keeps the door closed while the recorder is idle or in operation. However, since there is no locking means for the door in a conventional tape recorder, the door opens when a foreign object or even another cassette is inserted into the opening, thus breaking down the recorder frequently. Another drawback is that a child may be injured by inadvertently inserting a finger into the opening.

Accordingly, a solution for such problems described above has been proposed by the present inventor, which is shown in FIGS. 1 to 3. FIG. 1 shows a cassette holder 1 for receiving the cassette and a pair of guide brackets 2a and 2b for guiding the cassette holder 1 to a loading/unloading position. The guide brackets 2a and 2b include guide slots 3 and 4 to which guide pins 5a and 5b of the cassette holder 1 are respectively, slidingly connected. A pair of loading arms 6a and 6b rotatably connected to the guide brackets 2a and 2b are connected to the guide pin 5a. At the edge of the guide bracket 2a, there are provided means for opening and locking the door, including an opening lever 10 and a locking lever 20. Referring to FIG. 2, an opening pin 11 of the opening lever 10 is located in a guide slot 101 of a tape recorder door 100 and a locking pin 21 of the locking lever 20 is located on the inside behind the door 100. Referring to FIG. 3, when the cassette is inserted through a cassette opening 110 in front of the recorder, the door 100 opens and the holder 1 accepts the cassette. When the cassette is further inserted, a switch is activated to run a motor (not shown) for driving the loading arms 6a and 6b. Accordingly, the guide pins 5a and 5b of the cassette holder 1 slide along the guide slots 3 and 4, to thereby load the cassette on reel tables (not shown).

As the loading arms 6a and 6b rotate to move the cassette holder 1, the locking lever 20, which is supported by the loading arm 6a, falls due to gravitational force to be in a locked state. Therefore, once the cassette is loaded, the locking lever 20 does not allow the door 100 to open, thus, preventing insertion of another cassette, a finger, or other foreign objects. However, in the above recorder, the door 100 locks only after the cassette is loaded in the recorder, while the door cannot be locked when the cassette is not loaded.

Even when the cassette is not loaded in the recorder, a locking function for the door is required to prevent foreign objects such as a finger or a stick from being inserted through the door. Also, the door must allow the cassette itself to be inserted.

SUMMARY OF THE INVENTION

Accordingly, it is an object of the present invention to provide an apparatus for locking the tape recorder door wherein the door locks when an attempt to insert foreign objects is made but opens when the cassette is inserted, while maintaining the locking function after the cassette is loaded in the recorder.

To accomplish the above object of the present invention, there is provided an apparatus for locking a tape recorder door comprising: a door through which a cassette is inserted and ejected; an opening lever located on at least one side of the door and pushed by an edge of the cassette during insertion of the cassette, only when the cassette is inserted, the opening lever rotating to open the door when the cassette is ejected; and a locking lever engaged with the opening lever for releasing the door from a locked state when the opening lever moves, and blocking the door from opening when the opening lever does not move.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENTS

Figure 1:
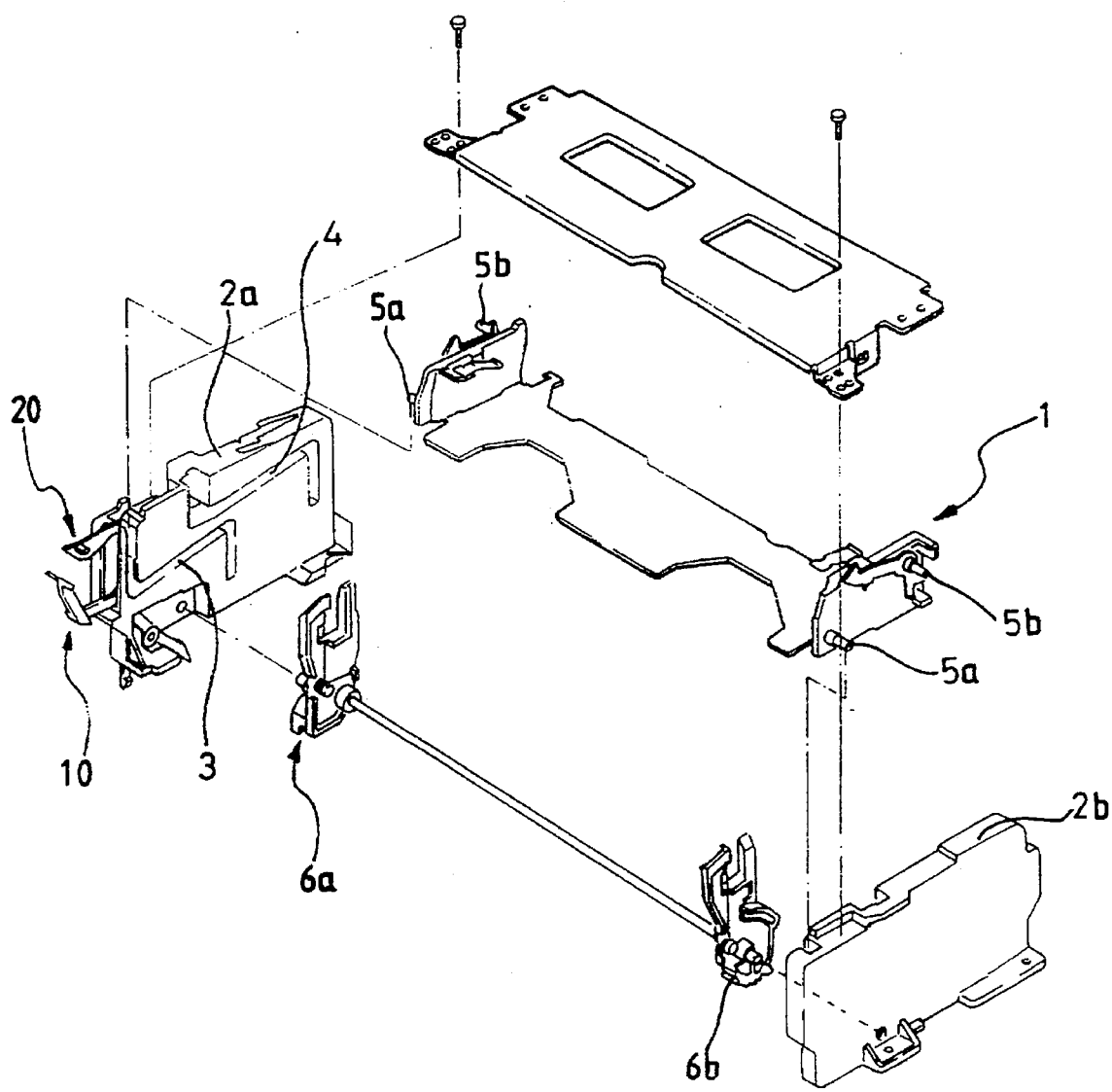
FIG. 1 is a partially exploded view of the loading mechanisms of a previously proposed tape recorder.
Figure 2:
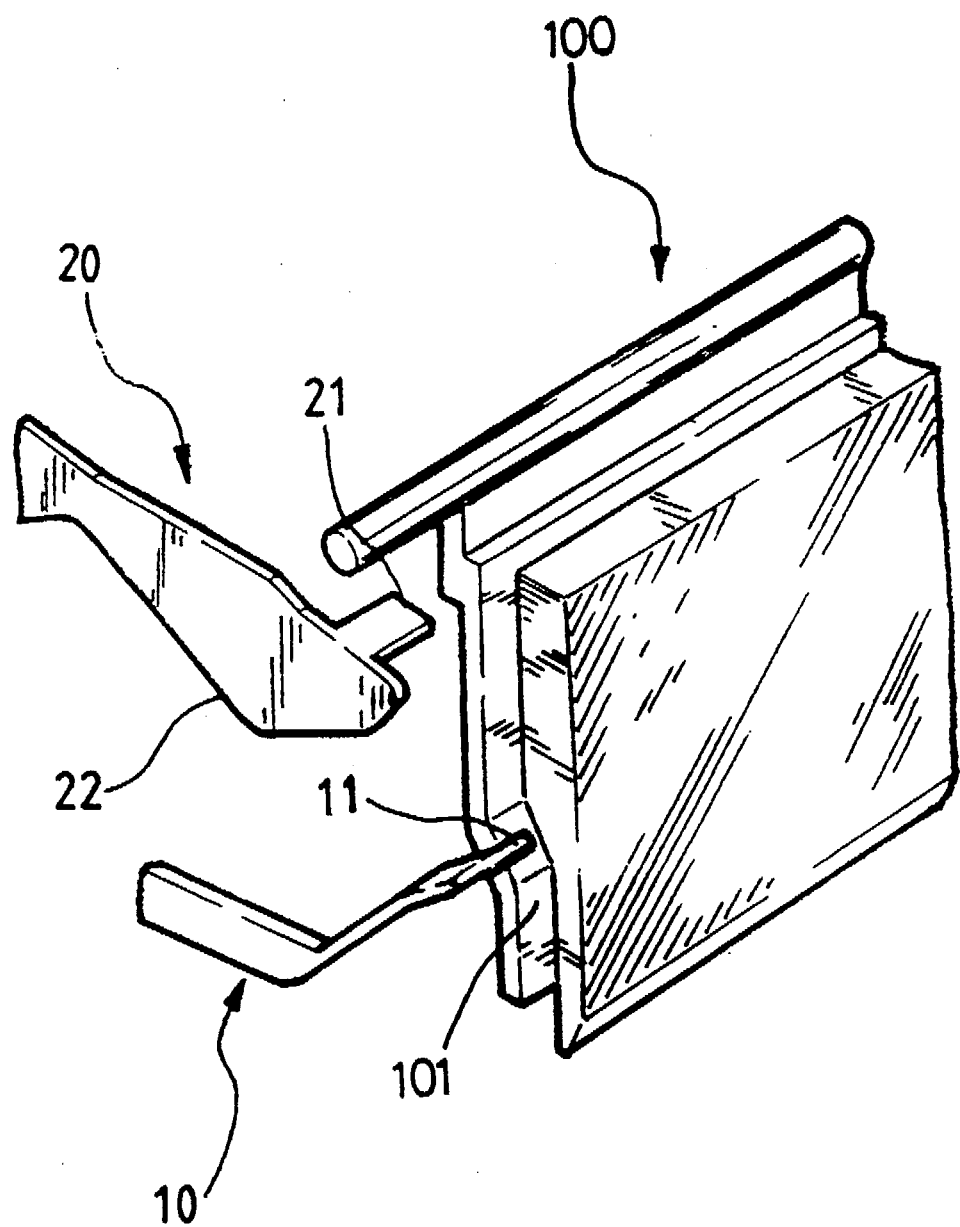
FIG. 2 is a partial view of the door of the tape recorder of FIG. 1.
Figure 3:
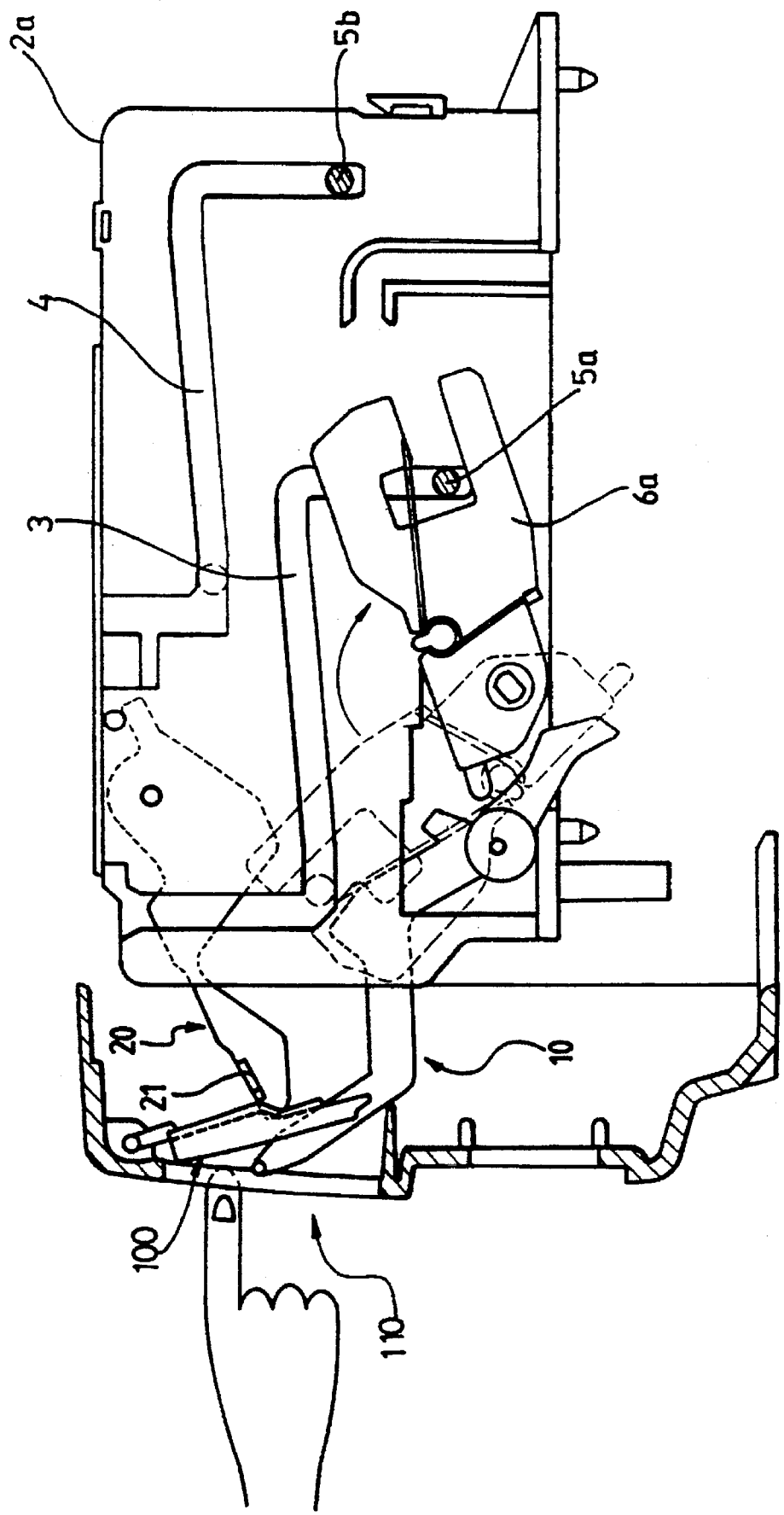
FIG. 3 is a sectional view showing the locking apparatus of the tape recorder of FIG. 1.
Figure 4:
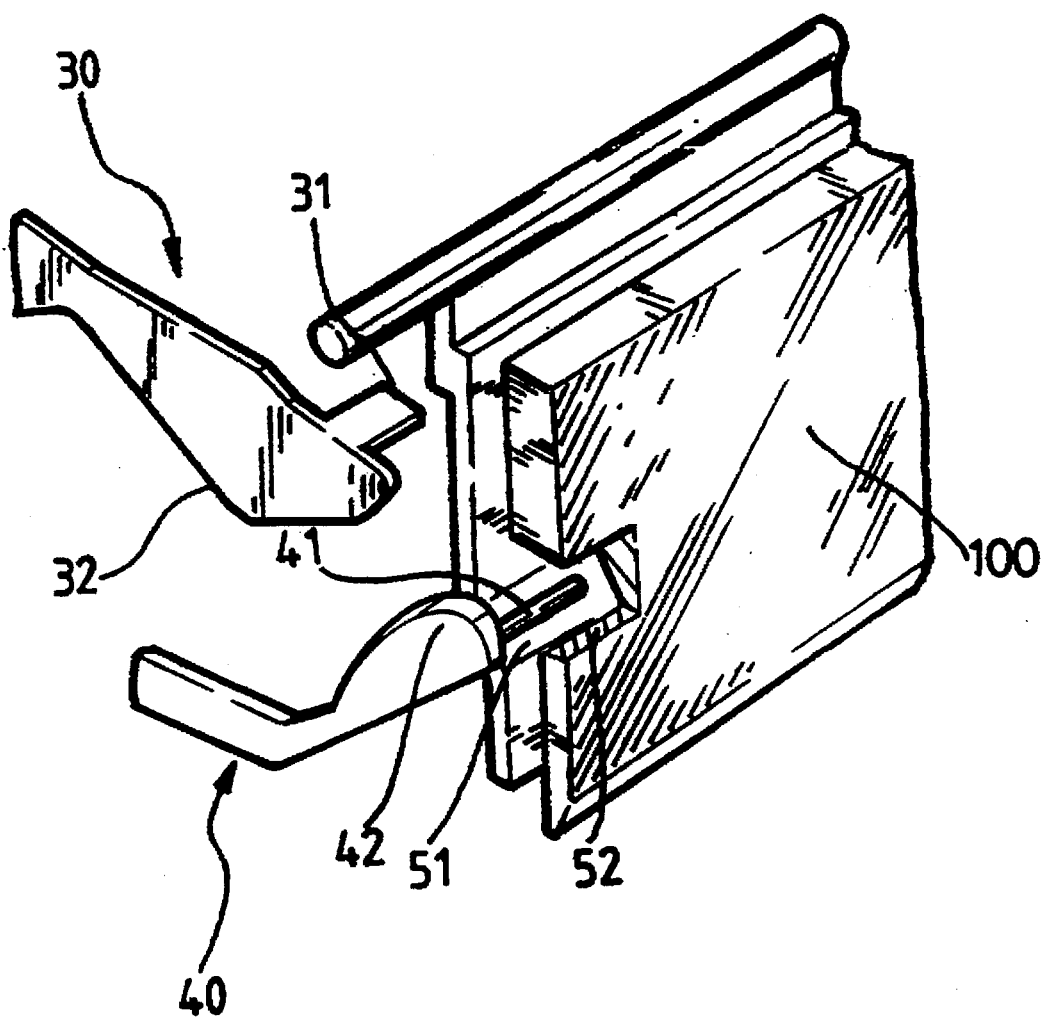
FIG. 4 is a partially perspective view of an apparatus for locking a tape recorder door according to the present invention.

FIGS. 4 through 9 show an apparatus for locking the door of a tape recorder according to the present invention. As shown in FIG. 4, locking lever 30 is pivotally connected to a guide bracket (not shown) at one side of a housing. A locking pin 31 extends from an end of the locking lever 30.

Under the locking lever 30, an opening lever 40 is also pivotally connected to the guide bracket. The opening lever 40 includes an opening pin 41 for opening a door 100.

Figure 5:
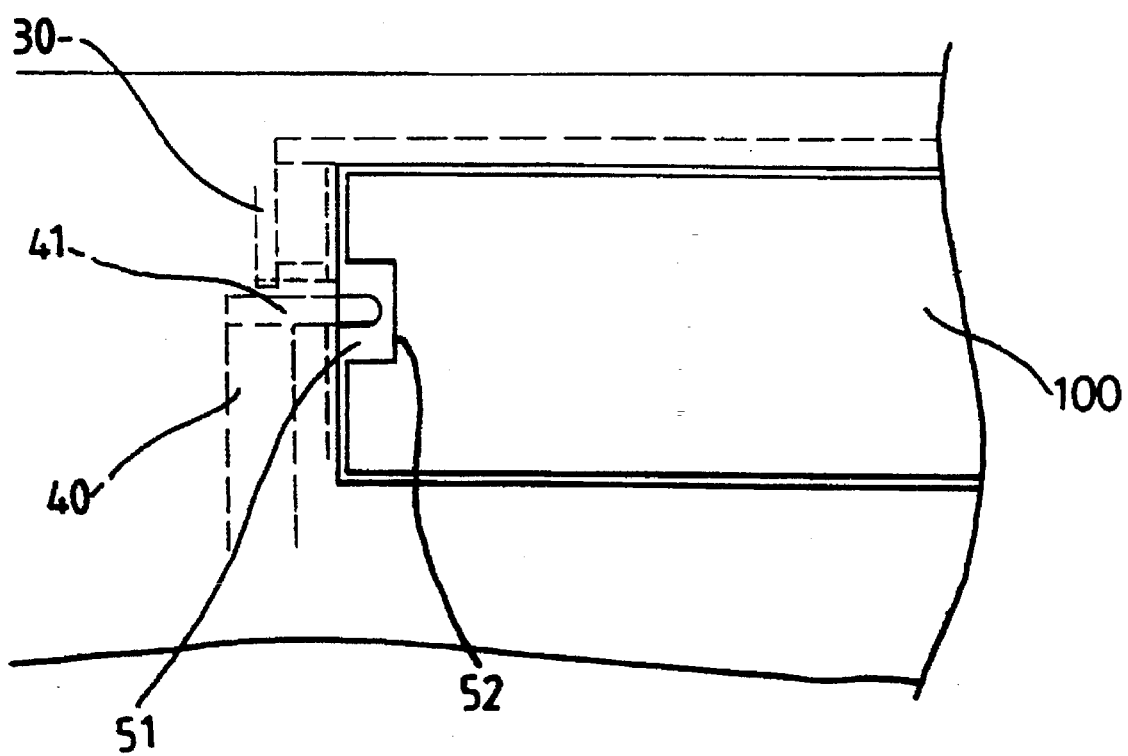
FIG. 5 is a front view of the apparatus of FIG. 4.

A guide slot 51 is formed on at least one side of the door 100 and the opening pin 41 of the opening lever 40 is located in the guide slot 51. There is an opening 52 formed on the side of the door 100 where the opening pin 41 is located. Accordingly, as shown in FIG. 5, the guide slot 51 of the door 100 and the opening pin 41 of the opening lever 40 can be seen through the opening 52.

Figure 6:
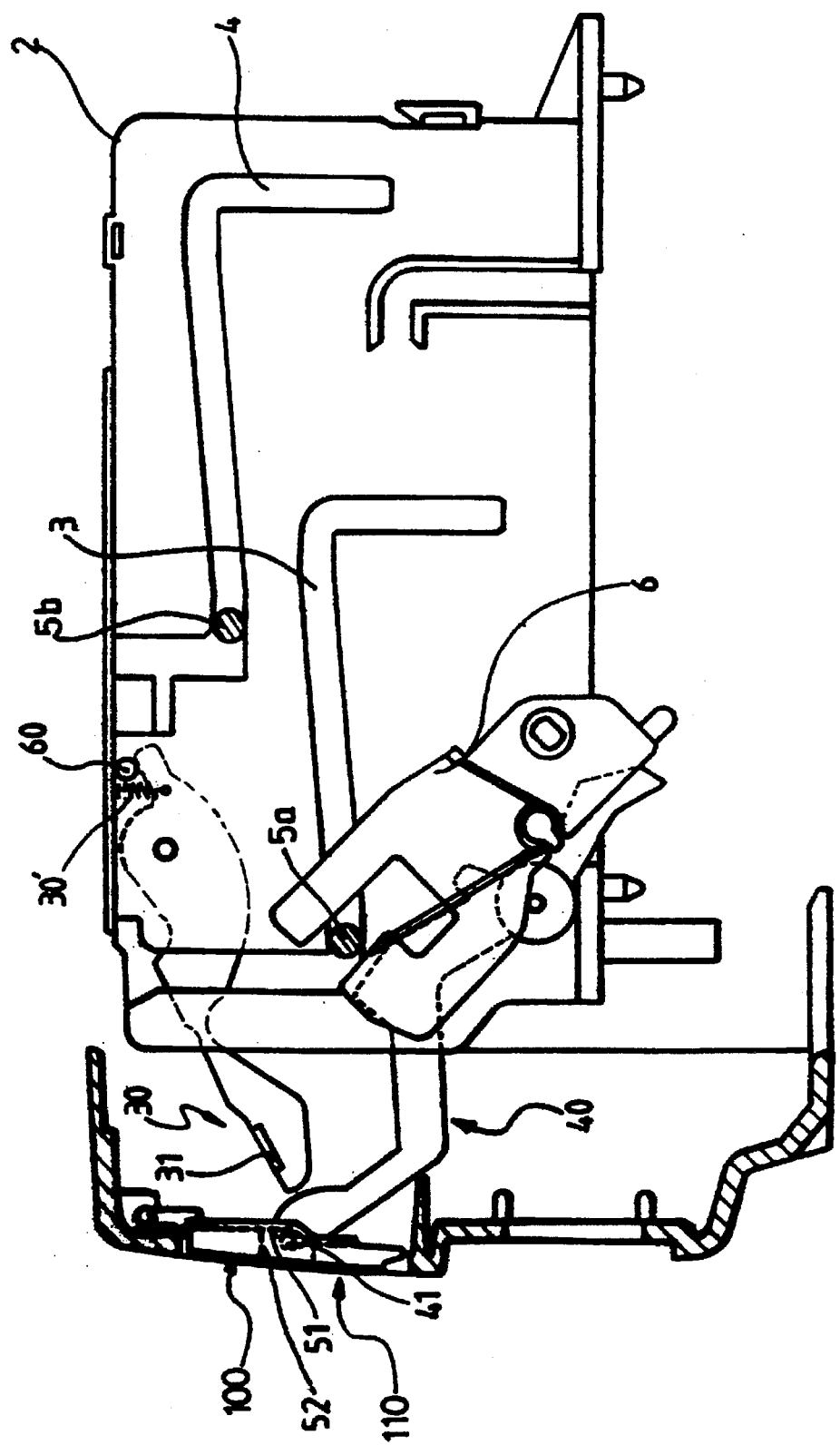
FIG. 6 is a sectional view showing the apparatus for locking the tape recorder door according to the present invention.

FIG. 6 shows the state of the recorder before a cassette is loaded. The door 100 covers a cassette insertion opening 110 by an elastic member such as a spring (not shown) and the opening pin 41 of the opening lever 40 is located in the opening 52 of the guide slot 51.

The locking lever 30 falls down due to the weight of the lever itself, to thereby position the leading edge of the locking lever 30 just behind the door 100 so that the locking pin 31 extending from the leading edge of the locking lever 30 makes direct contact with the door 100 to prevent it from opening. A stopper 60, whose position can be controlled appropriately, supports the lever 30 to prevent it from falling too low. It is also possible to have the leading edge of the locking lever 30 move down by means of an elastic member such as a spring 30' (see FIG. 6).

Figure 7:
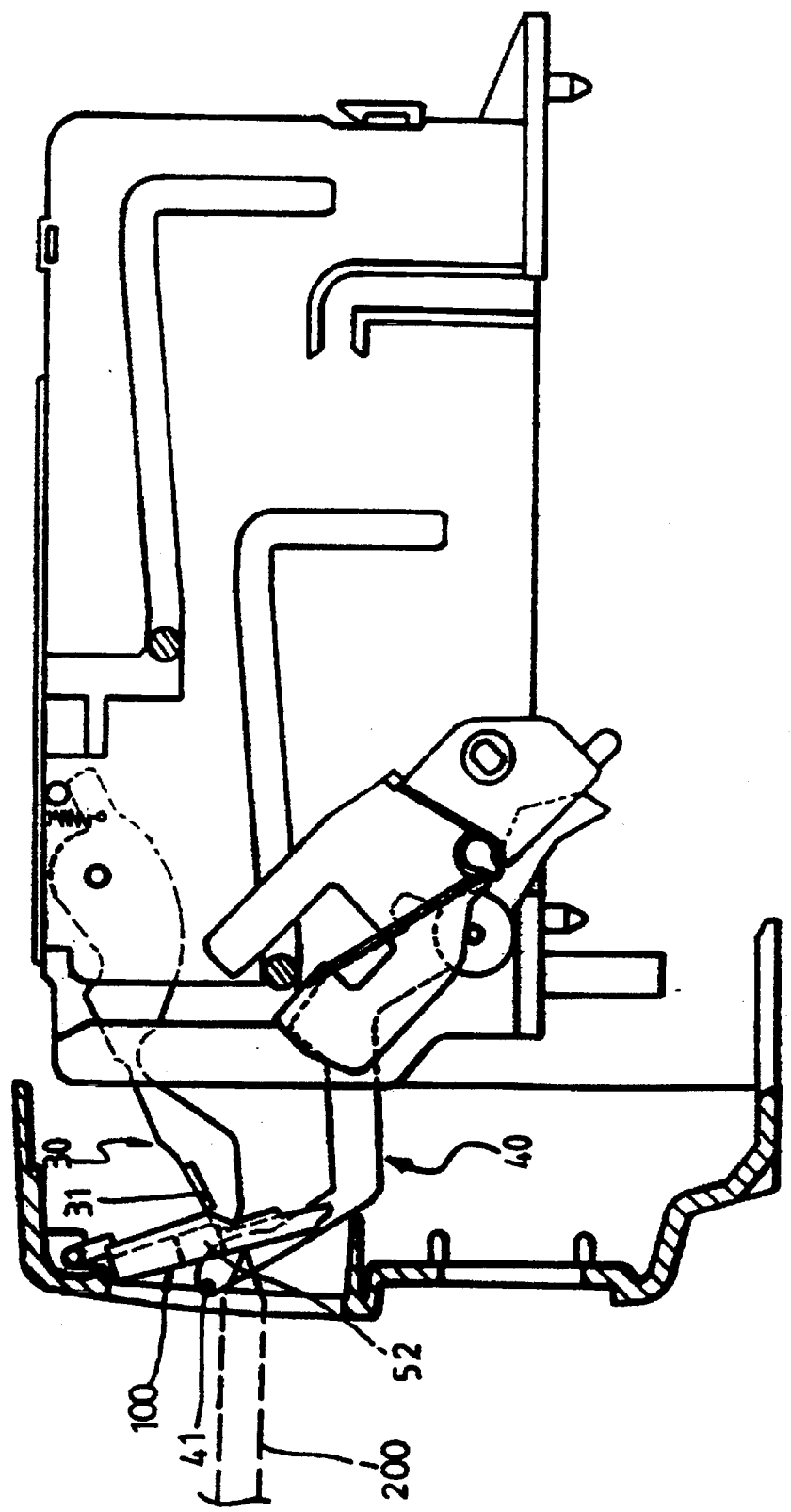
FIG. 7 is a view showing the apparatus of FIG. 6 when an attempt to insert a foreign object is made.

The locking lever 30 is in the down position when the cassette is not loaded. Thus, as shown in FIG. 7, when a foreign object 200 pushes against the door 100, the foreign object 200 can only push the door 100 but not the opening pin 41, which freely exits through the opening 52, of the opening lever 40 located at one side of the door 100. Likewise, when a cassette is inserted abnormally, i.e., when the cassette is inserted sideways, the opening lever 40 is not pushed. As a result, since the door 100 retreats with respect to the opening lever 40 and the opening pin 41, which freely exits through the opening 52, the opening pin 41 of the opening lever 40 maintains its original position with respect to the opening 52 of the door 100. The locking lever 30, which engages with the opening lever 40, also maintains its original state. Accordingly, as the door 100 moves back, it makes contact with the locking pin 31 of the locking lever 30, thereby preventing it from opening further.

Figure 8:
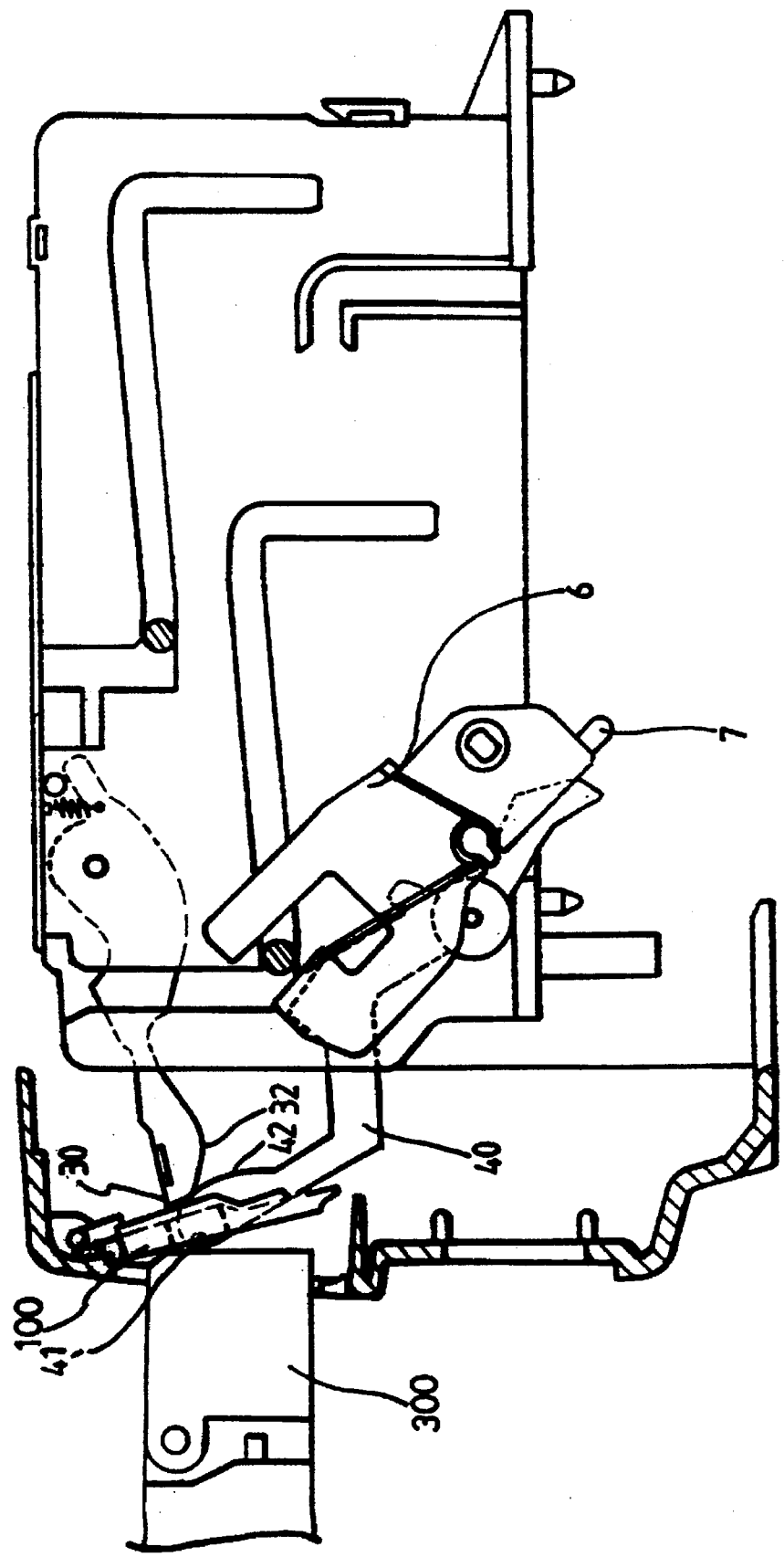
FIG. 8 is a view showing the apparatus of FIG. 6 when a cassette is inserted.

Referring to FIG. 8, when a cassette 300 is initially inserted through the cassette insertion opening 110, the cassette 300 pushes the front door 100 and the opening pin 41 of the opening lever 40 simultaneously. That is, since the cassette insertion opening 110 is similar in size to that of the side of the cassette 300 being inserted, the opening pin 41 of the opening lever 40 is pushed by the edge of the cassette 300 during insertion of the cassette 300. Accordingly, the leading edge of the opening lever 40 moves back as it rotates to raise the locking lever 30 located behind the door 100.

At this stage, the raising of the locking lever 30 by the opening lever 40 is achieved by a curved portion 42 of the opening lever 40, which slides along a cam following portion 32 of the locking lever 30. As the cassette 300 is inserted further, the cassette is received into a cassette holder (not shown). Subsequently, a switch (not shown) activates a driving motor (not shown) for driving a loading arm 6. Then, as the loading arm 6 rotates, a guide pin 5a (see FIG. 6) of the cassette holder is moved to load the cassette 300 to its final position.

Figure 9:
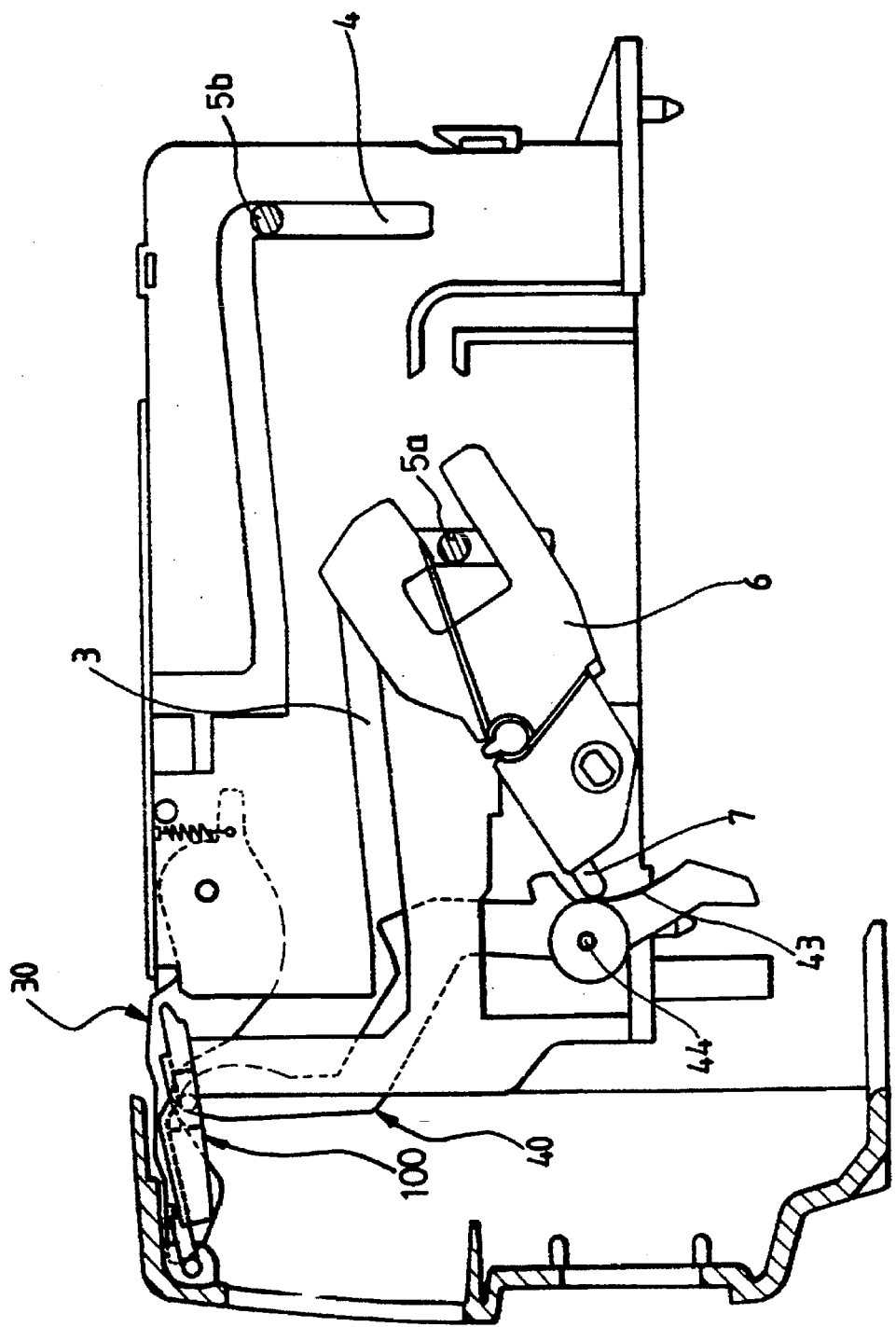
FIG. 9 is a view of the apparatus of FIG. 6 when the cassette is loaded near its fully loaded position.

During the above-mentioned process, the opening lever 40 moves back and rotates to fully raise the locking lever 30, whose state is shown in FIG. 9. When the loading of the cassette is completed, the door 100 returns to its original position by means of the elastic member such as a spring. Accordingly, the opening pin 41, which is in contact with the guide slot 51, and opening lever 40 also outwardly return to their original positions, and the locking lever 30, which is engaged therewith, falls due to gravity, thereby also returning to its original position.

The locations of the door 100, the opening lever 40 and the locking lever 30 after the loading of the cassette in the tape recorder is completed, are the same as that shown in FIG. 6. Accordingly, while the cassette is loaded in the recorder, the locking lever 30 prevents the door 100 from being opened so that a foreign object such as a finger or a stick cannot be inserted.

When the cassette is ejected, the loading arm 6 rotates while holding the guide pin 5a of the cassette holder. An end portion 7 (see FIG. 9) of the loading arm 6 slidingly applies pressure to the bottom portion 43 of the opening lever 40 to raise the opening lever 40.

Accordingly, the tip of the opening lever 40 rotates up clockwise about a pivot axis 44 so that the opening pin 41 slides along the guide slot 51 and the door 100 hinges open.

As described above, since the curved portion 42 of the opening lever 40 and the cam following portion 32 of the locking lever 30 are in contact and engage with each other, the locking lever 30 is raised to be released from a locked state. Accordingly, the door 100 opens completely and the cassette can be subsequently ejected through the cassette insertion opening 110. After the cassette is ejected and removed from the opening 110, the door 100 and the locking lever 30 return to their initial positions as shown in FIG. 6.

According to the present invention as described above, opening and closing of the door of a tape recorder can be suitably controlled, thereby preventing breakdown due to insertion of a foreign object or accidents caused by a child's finger being caught in the cassette opening.

It should be understood that the invention is not limited to the illustrated embodiment and that many changes and modifications can be made within scope of the invention.

What is claimed is:

1. An apparatus for locking a tape recorder door, comprising:

a door through which a cassette is inserted and ejected, said door including a guide slot formed on at least one side thereof and an opening which communicates with said guide slot;

an opening lever located on the at least one side of said door and operative to be pushed by an edge of the cassette during insertion of the cassette, said opening lever rotating to open said door when said cassette is ejected; and a locking lever, engaged with said opening lever, for releasing said door from a locked state when said opening lever moves, and blocking said door from opening when said opening lever does not move, wherein said opening lever comprises an opening pin slidably positioned in said guide slot, such that when foreign objects are attempted to be inserted through the door, said opening pin freely exists through said opening formed on said door and said opening lever does not move with said door, so that said locking lever blocks said door from opening, whereas when the cassette is properly inserted, said door opens by said opening pin being pushed by the edge of the cassette being inserted thereagainst and said opening lever rotates so as to raise said locking lever which is engaged with said opening lever, and when the cassette is ejected, rotation of said opening lever allows said opening pin to slide along said guide slot and said opening lever raises said locking lever to open the door.

2. The apparatus for locking a tape recorder door according to claim 1, wherein said locking lever, when not engaged with said opening lever, is actuated due to either the force of gravity or a biasing force from an elastic member so that a leading edge of said locking lever prevents said door from opening.

3. The apparatus for locking a tape recorder door according to claim 2, further comprising a stopper for controlling said locking lever so that said leading edge of said locking lever is positioned to prevent said door from opening.

4. The apparatus for locking a tape recorder door according to claim 2, wherein a locking pin for preventing said door from opening is formed on said leading edge of said locking lever.

5. An apparatus for locking a tape recorder door, comprising:

a door through which a cassette is inserted and ejected, said door including a guide slot formed on at least one side thereof and an opening which communicates with said guide slot;

an opening lever located on the at least one side of said door and including an opening pin slidably positioned in said guide slot and operative to be pushed by an edge of the cassette during insertion of the cassette; and a locking lever, engaged with said opening lever, for releasing said door from a locked state when said opening lever moves, and blocking said door from opening when said opening lever does not move, such that when foreign objects are attempted to be inserted through the door, said opening pin freely exits through said opening formed on said door and said opening lever does not move with said door, so that said locking lever blocks said door from opening, whereas when the cassette is properly inserted, said door opens by said opening pin being pushed by the edge of the cassette being inserted thereagainst and said opening lever rotates so as to raise said locking lever which is engaged with said opening lever.

* * * * *